(12) United States Patent
DeGraff et al.

(10) Patent No.: US 8,851,063 B1
(45) Date of Patent: Oct. 7, 2014

(54) FOOD SUSPENSION SYSTEM FOR BARBEQUE/SMOKER

(76) Inventors: Donald Joseph DeGraff, Oakdale, CA (US); Shawn Lee Phillips, Modesto, CA (US)

(*) Notice: Subject to any disclaimer, the term of this patent is extended or adjusted under 35 U.S.C. 154(b) by 414 days.

(21) Appl. No.: 13/104,020

(22) Filed: May 10, 2011

Related U.S. Application Data

(60) Provisional application No. 61/344,049, filed on May 13, 2010.

(51) Int. Cl.
F23L 13/06 (2006.01)
A23B 4/044 (2006.01)

(52) U.S. Cl.
USPC ........................................ 126/285 A; 99/480

(58) Field of Classification Search
CPC ........ A23L 1/01; A23L 1/0135; A23B 4/052; A23B 4/044; A47J 36/00; A47J 36/12; A47J 37/00; A47J 37/04; A47J 37/049; A47J 37/0688; A47J 37/07; A47J 37/0718; A47J 37/0704; A47J 37/0763; F23J 11/08; F23L 17/00; F24B 5/021; F24C 15/20; F24C 15/002; F24C 15/2085; F24C 15/2007
USPC ........... 126/21 R, 25 A, 25 AA, 25 R, 285 A; 99/419, 473, 480
See application file for complete search history.

(56) References Cited

U.S. PATENT DOCUMENTS

| | | | | |
|---|---|---|---|---|
| 1,711,631 A * | 5/1929 | Burnett | ......................... | 126/369 |
| 1,758,571 A * | 5/1930 | Hager | ......................... | 126/275 R |
| 2,645,993 A * | 7/1953 | Voss | ......................... | 99/480 |
| 3,088,393 A * | 5/1963 | Huckabee | ......................... | 99/340 |
| 3,333,526 A * | 8/1967 | Kirkpatrick | ......................... | 99/347 |
| 3,699,876 A * | 10/1972 | Ellis | ......................... | 99/396 |
| 3,765,397 A * | 10/1973 | Henderson | ......................... | 126/25 R |
| 3,776,127 A * | 12/1973 | Muse | ......................... | 99/482 |
| 3,856,374 A * | 12/1974 | Christen | ......................... | 312/263 |
| 3,861,288 A | 1/1975 | Cluff, Sr. et al. | | |
| 3,868,942 A | 3/1975 | Lewis | | |
| 3,937,359 A * | 2/1976 | Stockton, Jr. | ......................... | 220/369 |
| 3,942,425 A * | 3/1976 | Canright | ......................... | 99/467 |
| 3,974,760 A * | 8/1976 | Ellis | ......................... | 99/482 |
| 4,014,501 A * | 3/1977 | Buckenmayer | ......................... | 239/58 |

(Continued)

FOREIGN PATENT DOCUMENTS

CA  2088365 A1  2/1992
CN  201101239  8/2008

(Continued)

OTHER PUBLICATIONS

Shaw, Hank. How to Turn Your Kettle Grill into a Smoker. Simply Recipes. Jul. 2, 2008 [retrieved Sep. 18, 2013]. Retrieved from the Internet <URL: http://www.simplyrecipes.com/recipes/how_to_turn_your_kettle_grill_into_a_smoker/>.*

*Primary Examiner* — Kenneth Rinehart
*Assistant Examiner* — David J Laux
(74) *Attorney, Agent, or Firm* — Tran & Associates

(57) ABSTRACT

Systems and methods are disclosed for cooking one or more food items by vertically suspending each food items inside a container; placing a heat source under the vertically suspended food items; and cooking the one or more food items without rotating, flipping or turning to avoid unwanted searing on a hot grate surface.

19 Claims, 3 Drawing Sheets

(56) References Cited

U.S. PATENT DOCUMENTS

| | | | |
|---|---|---|---|
| 4,020,322 A | | 4/1977 | Muse |
| 4,140,049 A | * | 2/1979 | Stewart ............... 99/483 |
| 4,170,173 A | | 10/1979 | Bradford |
| 4,355,570 A | * | 10/1982 | Martin et al. ............ 99/446 |
| 4,418,615 A | | 12/1983 | Higgins |
| 4,467,709 A | | 8/1984 | Anstedt |
| 4,665,891 A | | 5/1987 | Nemec et al. |
| 4,712,491 A | * | 12/1987 | Schmidt ............... 110/346 |
| 4,757,756 A | | 7/1988 | Van Marr |
| 4,788,906 A | | 12/1988 | Starks |
| 4,934,260 A | | 6/1990 | Blevins |
| 5,138,939 A | | 8/1992 | Bradley et al. |
| 5,213,299 A | * | 5/1993 | Henry ............... 248/354.4 |
| 5,605,142 A | | 2/1997 | Parker |
| 5,687,704 A | * | 11/1997 | Lerch et al. ............ 126/25 R |
| 5,711,209 A | | 1/1998 | Guines |
| 5,730,046 A | | 3/1998 | Battaglia et al. |
| 5,755,151 A | | 5/1998 | Nowicke, Sr. |
| 5,826,497 A | * | 10/1998 | Basso ............... 99/446 |
| 5,865,099 A | | 2/1999 | Waugh |
| 5,891,498 A | | 4/1999 | Boehler |
| 5,909,729 A | | 6/1999 | Nowicke, Jr. |
| 5,983,882 A | * | 11/1999 | Ceravolo ............ 126/25 R |
| 6,205,912 B1 | | 3/2001 | Chiu |
| 6,209,533 B1 | | 4/2001 | Ganard |
| 6,293,271 B1 | * | 9/2001 | Barbour ............... 126/25 R |
| D463,948 S | | 10/2002 | Innes |
| 6,557,545 B2 | * | 5/2003 | Williams ............ 126/25 R |
| 6,789,462 B1 | | 9/2004 | Hamilton |
| 6,913,011 B1 | | 7/2005 | Snider |
| D574,177 S | | 8/2008 | Hulsey |
| 7,469,630 B1 | | 12/2008 | Ray |
| 7,984,709 B1 | * | 7/2011 | Byrnes et al. ............ 126/250 |
| 2002/0108502 A1 | | 8/2002 | Kim |
| 2002/0112716 A1 | * | 8/2002 | Liu ............... 126/25 R |
| 2003/0019492 A1 | | 1/2003 | Williams |
| 2003/0037781 A1 | | 2/2003 | Wu |
| 2003/0150336 A1 | | 8/2003 | Roescher |
| 2004/0025714 A1 | | 2/2004 | Neal et al. |
| 2004/0154606 A1 | | 8/2004 | McNeill |
| 2004/0237801 A1 | | 12/2004 | Starkey |
| 2004/0250690 A1 | * | 12/2004 | Restis et al. ............ 99/403 |
| 2004/0255926 A1 | | 12/2004 | Waits et al. |
| 2005/0121018 A1 | | 6/2005 | Rosen |
| 2005/0155498 A1 | | 7/2005 | Killion |
| 2006/0191527 A1 | | 8/2006 | Steadman |
| 2006/0249036 A1 | | 11/2006 | Liu |
| 2006/0254433 A1 | | 11/2006 | Oberlander et al. |
| 2007/0283945 A1 | | 12/2007 | Gabrielle |
| 2008/0047541 A1 | * | 2/2008 | Fou et al. ............ 126/25 R |
| 2009/0199839 A1 | * | 8/2009 | Hulsey ............ 126/25 A |
| 2009/0320882 A1 | | 12/2009 | Averwater |
| 2010/0218691 A1 | | 9/2010 | Adams et al. |
| 2010/0269713 A1 | * | 10/2010 | Foster ............... 99/482 |
| 2011/0275023 A1 | * | 11/2011 | Knight ............... 432/1 |

FOREIGN PATENT DOCUMENTS

| | | |
|---|---|---|
| CN | 201139456 | 10/2008 |
| CN | 101455529 | 6/2009 |
| CN | 101455529 A | 6/2009 |
| CN | 201299466 | 9/2009 |
| CN | 201375430 | 1/2010 |
| CN | 201388923 | 1/2010 |
| DE | 3533558 A1 | 3/1987 |
| DE | 20220522 | 9/2003 |
| DE | 202004018488 | 2/2005 |
| DE | 202005011144 | 10/2005 |
| DE | 202006008387 | 8/2006 |
| FR | 2928531 A1 | 9/2009 |
| FR | 2943231 A1 | 9/2010 |
| GR | 1006283 B1 | 2/2009 |
| JP | 11104020 A | 4/1999 |
| JP | 2972199 B1 | 11/1999 |
| JP | 2004141603 A | 5/2004 |
| JP | 2005192828 | 7/2005 |
| KR | 20020050195 | 6/2002 |
| KR | 20090060097 | 6/2009 |
| WO | WO2004003436 | 1/2004 |
| WO | WO2010005549 | 1/2010 |
| WO | 2010063992 A1 | 6/2010 |
| WO | WO2010063992 | 6/2010 |

* cited by examiner

FOOD SUSPENSION SYSTEM FOR BARBEQUE/SMOKER

The present application claims priority to Provisional Application Ser. No. 61/344,049, filed May 13, 2010, the content of which is incorporated by reference.

BACKGROUND OF THE INVENTION

The present invention relates generally to outdoor cooking devices and more specifically it relates to outdoor cooking devices such as a barbeque or smoker but not limited to such.

DESCRIPTION OF RELATED ART

Barbeque/smokers are commonly used to cook foods. Typical barbeque/smokers cook food such as meat, poultry, fish and the like on systems using horizontal grates. It is understandable that these methods are inadequate at times because food resting on a horizontal grate system requires constant movement such as flipping and/or turning to avoid burning, charring. This results in significant loss of moisture. The placement of food on a horizontal grate system demands constant monitoring by the person(s) barbequing. Typical barbecue/smoker users must remain close by or return in short time intervals to monitor the status of food being cooked so as to avoid overcooking and/or burning. Over the years, many auxiliary devices have been introduced to solve this problem.

Barbeque accessories such as rotisserie kits have been devised to rotate food in an effort to promote even cooking. While they have positive results, rotisseries require energy such as electricity to create the rotation. Certain accessory products such as those included with Weber®, Char-Broil®, Traeger® grills/smokers, among others, have not lessened the need for constant monitoring of food placed on generally horizontal grates, nor have they lessened demand for energy to power their accessories.

An additional problem associated with typical barbeques is that placing meats and other food items on a hot grate surface puts them in direct contact with carcinogens. Known carcinogens, particularly heterocyclic amines or HCA's, develop in meat, poultry and fish and are embedded into the char and burnt food portions as a result of direct contact with a scorching hot grate. HCA's are byproducts of a reaction between a substance found in muscle tissue and the food's natural amino acids. If foods, and more specifically meat poultry and fish in contact with a hot grate, are not closely observed or frequently monitored during the cooking process, charring develops across the entire contact surface increasing the opportunity for carcinogens being embedded, later to be consumed and digested in the human body. This is true for both gas and briquette barbeque/smokers.

All these problematic issues apply currently available barbeque/smoker systems, making otherwise pleasant task of outdoor cooking a relatively difficult and high maintenance "job" for those responsible for the "cooked" food. What is sorely needed is a barbeque/smoker system that overcomes problems associated with prior art systems, greatly reducing the problematic drying-out, scorching, charring, and so forth—and certainly addressing the issue of unwanted carcinogens such as HCA's. The present invention introduced in detail herebelow comprises a novel suspension system for foods being prepared in a barbeque/smoker device. The improvement allows the person(s) cooking, at home or in the trade, to be free from enslavement to the demanding barbeque/smokers of the past.

BRIEF SUMMARY OF THE INVENTION

In one aspect, systems and methods are disclosed for cooking one or more food items by vertically suspending each food items inside a container; placing a heat source under the vertically suspended food items; and cooking the one or more food items without rotating, flipping or turning to avoid unwanted searing on a hot grate surface.

In another aspect, the barbeque/smoker system incorporating the food suspension features of the present invention overcomes the problems associated with prior art. The barbeque/smoker system includes a generally vertical hanging or suspension arrangement to keep meat and other foods from touching a hot grate; thus, significantly reducing carcinogen levels typically found in charred or burnt meats and foods that are permitted to reside on a hot grate. This inventive system further provides a predictable cooking methodology that makes it easy for inexperienced users to properly cook meats and other foods. It frees users from constant monitoring of the barbequing/smoking of food.

Advantages of the preferred embodiments may include one or more of the following. The generally vertical hanging or suspension system permits cooking the meat and/or other foods from all directions. Further shown herein, the present suspension system avoids food/grate contact as well as the need for an external energy source, such as electricity, to rotate the food being cooked. The improved barbeque/smoker also includes accessories that make the cooking more convenient. The reason carcinogens are greatly reduced in the present invention is because charring is essentially avoided since there is no direct contact to a scorching, searing hot grate. The present invention is typically made of steel but may be made of any other type of material suitably resistant to high temperature damage associated with the cooking, smoking or barbequing of foods. An additional benefit to the present invention is that it will substantially eliminate requirement for constant movement, as by turning or flipping of barbequing/smoking meats and other foods. The present invention is seen as greatly reducing any need for constant monitoring. As will be described herein, the barbeque/smoker deploys a system and method of hanging meat or other foods instead of direct placement on grates.

Embodiments of the system can provide:
1) a barbeque/smoker that uses a generally vertical system of hanging meat and foods;
2) means of using a suspension or hanging system to elevate or suspend the meat and other foods above an optional grate;
3) means of using the hanging system to elevate or suspend the meat and foods above an open flame;
4) means of utilizing natural rotating forces of circular heat to move suspended foods;
5) means to reduce the constant monitoring of the barbequing/smoking of meats and other foods;
6) means of cooking the meat or other foods without rotating, flipping or turning to avoid unwanted searing on a hot grate surface;
7) means of reducing carcinogen intake due to direct food contact with the grate;
8) means enabling a cooking device to have dual use as a barbeque or smoker as determined by optional fuel selection, ventilation and temperature control.

BRIEF DESCRIPTION OF THE DRAWINGS

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

In the following paragraphs, the present invention will be described in detail by way of example with reference to the attached drawings. Throughout this description, the preferred embodiment and examples shown should be considered as exemplars, rather than as limitations on the present invention. As used herein, the "present invention" refers to any one of the embodiments of the invention described herein, and any equivalents. Furthermore, reference to various feature(s) of the "present invention" throughout this document does not mean that all claimed embodiments or methods must include the referenced feature(s).

DETAILED DESCRIPTION OF THE INVENTION

A. Overview

Figure 1:
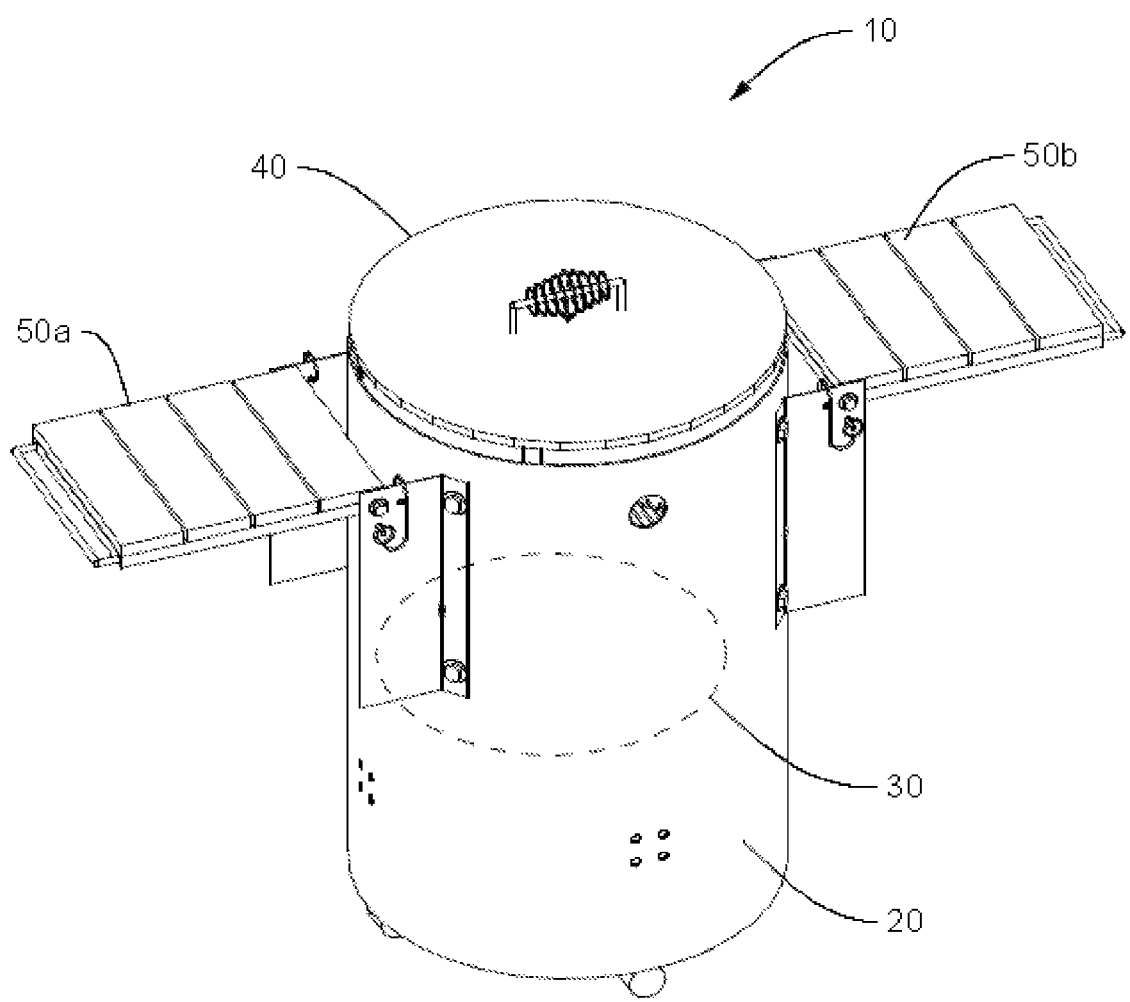
FIG. 1 is a perspective view of the present invention illustrating the barbeque/smoker suspension system.

In FIG. 1 the present invention 10 is seen to comprise container 20 with an internal catch grate 30 (dash lines), a lid 40, two folding side tables 50a and 50b. The essentially round container 20 with adjustable lid 40 enables heat to circulate around hanging meat and/or other foods to cook from all directions. Internal catch grate 30 acts as a barrier to keep meat and other foods from accidentally falling into the heat source. Grate 30 may also be used to support certain foods for warming purposes within the high-temperature container 20. The two tables 50a and 50b (which may of course be more or less in number) may be rigidly affixed and/or pivotally mounted for folding, as shown herein. These table surfaces 50a, 50b are conveniently attached to substantially round container 20 providing a food preparation area and/or work area.

B. Detail Description of Main Components and Method of Use

Figure 2:
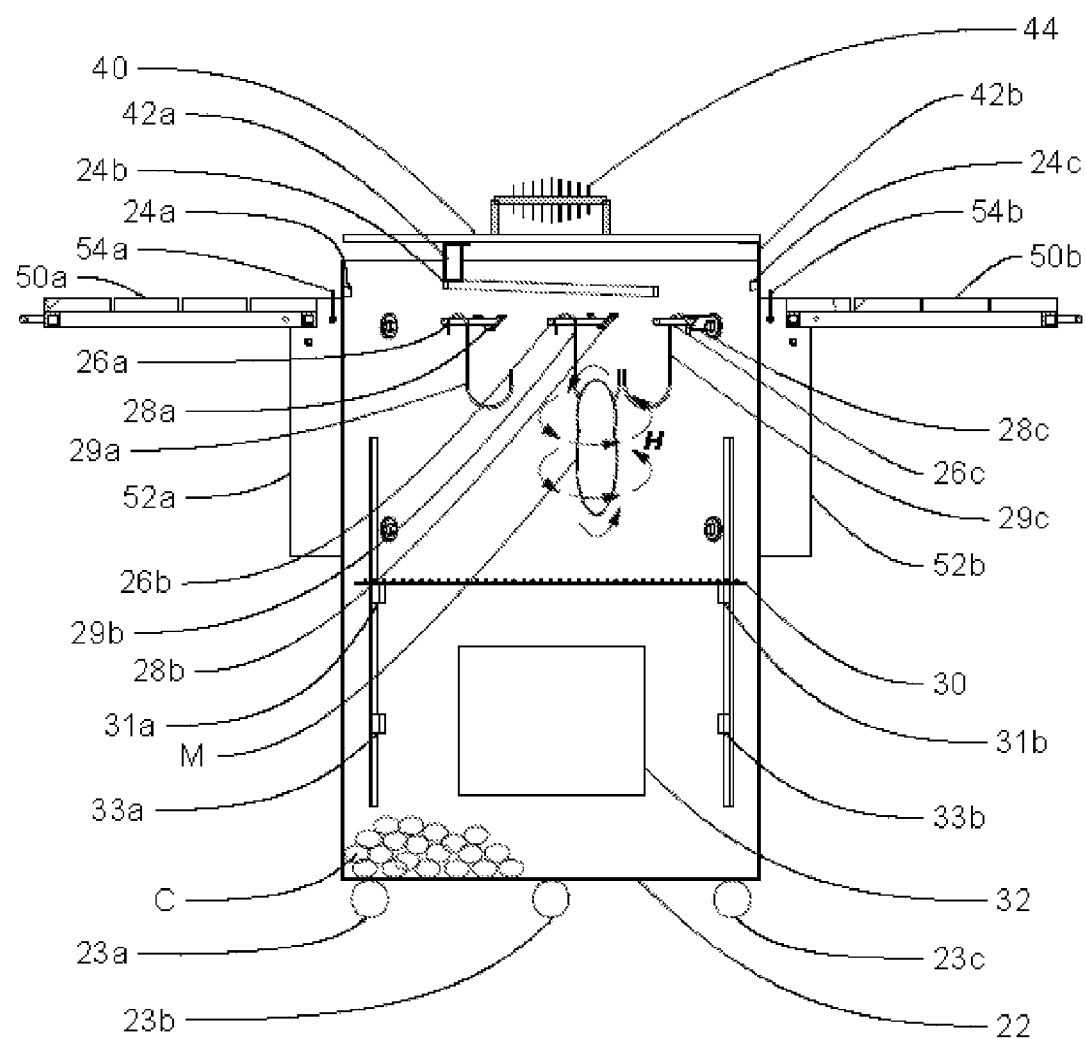
FIG. 2 is a front elevation view of the present invention showing the components and accessories and how the present invention functions.
Figure 3:
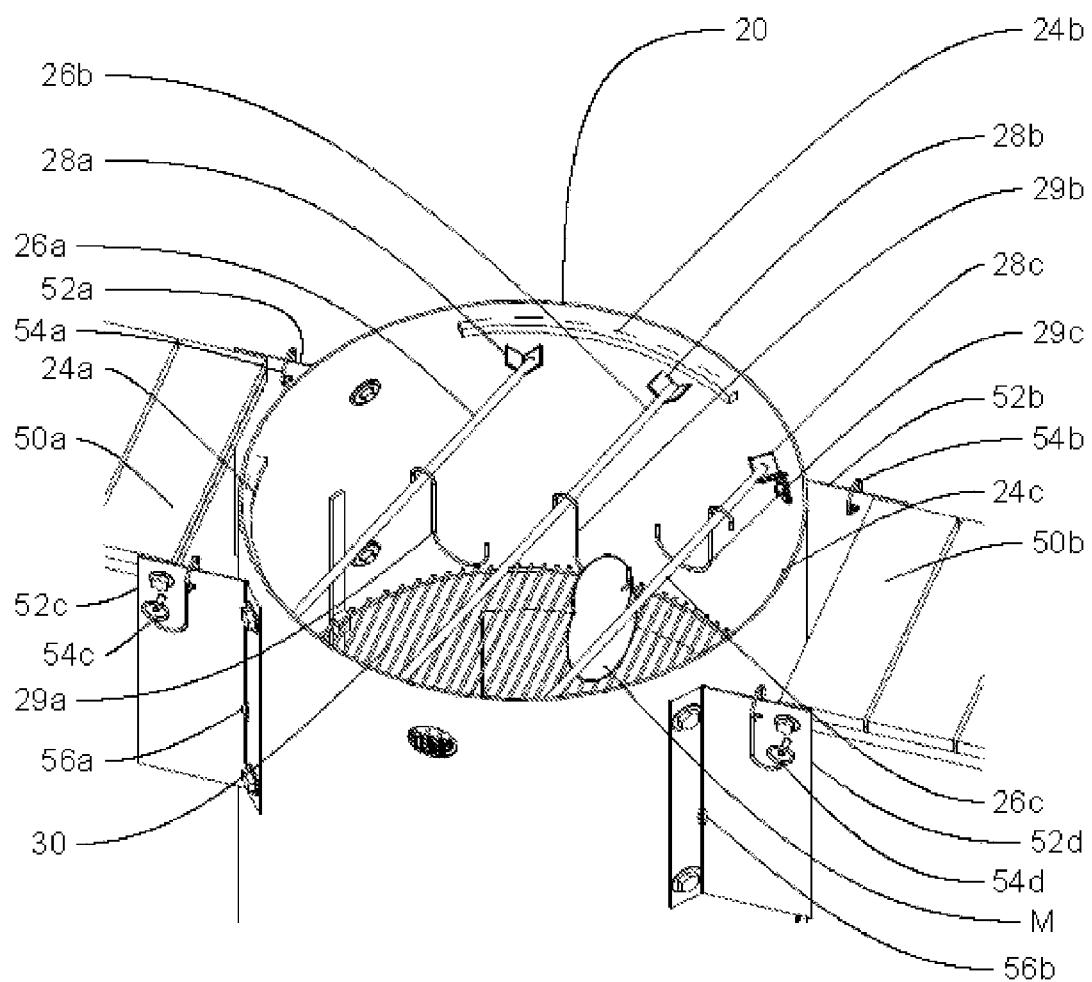
FIG. 3 is a top perspective view revealing the interior of the present invention, showing the components and accessories and how the present invention functions.

In FIGS. 2 and 3 the present invention 10 is more clearly illustrated as comprising container 20 standing generally vertically, thus accommodating its array of generally vertical hanging system elements. Container 20 may be made with any material suitable for cooking and its prefabricated configuration may be produced in any size and/or shape. In fact, production models of the present invention may range from relatively small sized units easily stored and managed by a single user or small family, to very large size more suitable to commercial or large scale use. FIGS. 1, 2 and 3 illustrate an example of a generally round shaped drum configured to stand substantially vertically as opposed to generally horizontal commonly found in pre-existing cooking containers of this type. The generally vertical disposition of container 20 is critical to the barbecue/smoker's suspension system of cooking and its functionality.

Charcoal (or the like fuel) elements C are placed in/near bottom 22 of container 20 and ignited in a conventional manner. An access hole covered by door 32 is cut or otherwise formed into a side surface of container 20 at a lower location thereon to afford intake ventilation, fuel element ignition and stirring, and to accommodate adding and removing fuel as desired. The fuel may include wood chips or any other form of suitable fuel for advantageous cooking effects. Embodiments of this invention may include propane or natural gas feed via generally conventional interconnections as a heat source.

A variable height grate 30 is typically placed at a generally midway location and is supported, for example, by adjustable height tabs 31a, 31b and 31c (not shown). Grate 30 typically serves several purposes. Example 1: Grate 30 acts as a catch grate to prevent hanging meat or other suspended foods from falling into the fuel source. Example 2: The variable height grate 30 may serve as a cooking shelf to cook or heat up condiments such as foil-wrapped corn, potatoes and bread. Example 3: Lowering grate 30 to rest on tabs 33a, 33b and 33c (not shown) allows the user to cook longer or taller foods, for example, a "rack of ribs." Example 4: With grate 30 resting on tabs 31a, 31b and 31c (not shown); adding an additional grate below catch grate 30 resting on tabs 33a, 33b and 33c (not shown) allows the user to put in place a container filled with liquid such as beer or wine. Evaporating liquid is absorbed into the meat and/or other foods thereabove. Example 5: Adding another grate below grate 30 so as to support the fuel elements above the container 20 floor 22 enables the user elevate the fuel, allowing ash to fall through to the bottom 22, lengthening the life span of present invention 10.

Lid 40 may have at least one and perhaps up to three or more tabs 42a, 42b and 42c (not shown) that rest upon corresponding inclined rails depicted for example at 24a, 24b and 24c. By slightly rotating lid 40 on inclined rails 24a, 24b and 24c a gap is created between container 20 and lid 40 creating an adjustable air ventilation system. The inclination of the three (more or less) rails 24a (not shown), 24b and 24c (inclination not shown but similar to that of rail 24a) illustrates a vertically inclining/declining disposition that allows for the gap in the lid to be increased or decreased as desired. Other equivalent gap controls are, of course, acceptable.

Controlling of a gap between lid 40 and container 20 allows the present invention 10 to act as a smoker or a barbeque. For example, a smaller gap lends itself toward a slow cooking process with temperature ranging from 100 to 225 degrees Fahrenheit, as would a smoker. A larger gap allows more air flow resulting in higher temperatures from 225 degrees Fahrenheit, a range more typical of barbeques.

Referring to FIGS. 2 and 2a container 20 includes three removable, generally horizontal rods 26a, 26b and 26c resting respectively in six supports 28a, 28b, 28c, 28d though 28f (not shown). Substantially S-shaped hooks 29a, 29b, and 29c are suspended on horizontal rods 26a, 26b and 26c respectively. These hooks, constructed of stainless steel or the like, serve to suspend meat and other foods above internal catch grate 30 and fuel source. As shown, meat M is suspended from hook 29b, thus allowing heat H (as illustrated by arrows) to circulate around meat M for an even cooking result. This avoids the flipping or rotating action or movement required in typical horizontal grate system barbeque and/or rotisserie systems.

Tables 50a and 50b are mounted onto brackets 52a, 52b, 52c and 52d respectively. Tables 50a and 50b may be lowered or raised as desired and locked into place with pin/cable 54a, 54b, 54c and 54d or any other means necessary such as a ram or shock (not shown) to keep tables 50a and 50b in outwardly raised or inwardly lowered position. Brackets 52a, 52b, 52c and 52d may also be made with a notch/knock-out 56a, 56b, 56c (not shown) and 56d (not shown) located at near midway points to allow for mounting onto typical oil drum barrels that have a circular outwardly disposed strengthening ribs.

It is important to note that the even flow of heat substantially reduces burning and charring and provides a slow cooking system that requires little to no monitoring or maintenance. It is the combination of the vertical hanging and ventilation system described above that gives present invention 10 a distinct advantage in ease of use and frees up the users to enjoy their event and not become a slave to the barbeque as is commonly the case with prior art, horizontal cooking systems.

The ease of use and moist food produced by present invention 10 (with some experience) is consistent whether one piece of meat, or twenty pieces of meat, are being hung in container 20 for a small or large gathering. As shown, this method is a proven system for reducing unwanted side effects associated with standard barbeques, including a significant and consistent reduction of known carcinogens.

C. Method of Transporting

In FIG. 2 barbeque/smoker 10 method of transportation is shown with container 20 supported by a suitable number of wheel casters depicted for example as 23a, 23b, 23c and 23d (not shown), thus supporting barbeque/smoker 10 in a level disposition. The wheel casters (again, in suitable numbers and depicted for example as) 23a, 23b, 23c and 23d (not shown) and their configuration provide for maximum mobility for transportation of the barbeque/smoker 10. Wheel casters 23a, 23b, 23c and 23d (not shown) in combination with the (up to two or more) folding tables 50a and 50b (in a lowered or closed and locked position) allow the user to push or pull the barbeque/smoker 10 into the desired location and position for cooking or storage.

In addition to mobility, wheel casters 23a, 23b, 23c and 23d provide stability for the barbeque/smoker when being used. Stability becomes critically important to the function and safety of barbeque/smoker 10 when the two folding tables 50a or 50b are raised to an open and locked working surface position. Wheel casters 23a, 23b, 23c and 23d (not shown) are configured and located so as to resist easy rotation or tipping of barbeque/smoker 10 as food weight is placed on only one side table 50a or 50b.

D. Variations

The spirit of the present invention provides a breadth of scope that includes all methods of making and using it. Any variation on the theme and methodology of accomplishing the same that are not described herein would be considered under the scope of the present invention.

Various modifications and alterations of the invention will become apparent to those skilled in the art without departing from the spirit and scope of the invention, which is defined by the accompanying claims. It should be noted that steps recited in any method claims below do not necessarily need to be performed in the order that they are recited. Those of ordinary skill in the art will recognize variations in performing the steps from the order in which they are recited. In addition, the lack of mention or discussion of a feature, step, or component provides the basis for claims where the absent feature or component is excluded by way of a proviso or similar claim language.

While various embodiments of the present invention have been described above, it should be understood that they have been presented by way of example only, and not of limitation. Likewise, the various diagrams may depict an example architectural or other configuration for the invention, which is done to aid in understanding the features and functionality that may be included in the invention. The invention is not restricted to the illustrated example architectures or configurations, but the desired features may be implemented using a variety of alternative architectures and configurations. Indeed, it will be apparent to one of skill in the art how alternative functional, logical or physical partitioning and configurations may be implemented to implement the desired features of the present invention. Also, a multitude of different constituent module names other than those depicted herein may be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead may be applied, alone or in various combinations, to one or more of the other embodiments of the invention, whether or not such embodiments are described and whether or not such features are presented as being a part of a described embodiment. Thus the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, may be combined in a single package or separately maintained and may further be distributed across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives may be implemented without confinement to the illustrated examples. For example, block diagrams and their accompanying description should not be construed as mandating a particular architecture or configuration.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A cooking device, comprising:
    a container;
    a lid with one or more tabs that rest upon corresponding inclined rails to create a gap between the container and the lid to provide adjustable air ventilation; wherein the lid comprises three tabs resting on three inclined rails on a lower surface of the lid, and wherein the lid is rotated on the inclined rails to create a gap for an adjustable air ventilation; and
    one or more sets of ventilation holes between the heat source and a food item, wherein the tabs rest on corresponding inclined rails to create a variable gap between the container and the lid to provide air escape or exhaust ventilation and wherein working in combination, the lid, tabs, and inclined rails control an air escape or exhaust which controls allowable air entering through the intake ventilation holes between the heat source and the food item.

2. The device of claim 1, comprising a variable height grate between the heat source and the one or more food items.

3. The device of claim 1, wherein the opening between a heat source and a food item provides natural rotating forces of circular heat to cook the suspended food item, wherein the container is selectably convertible into a grill, a barbeque machine or a smoker through fuel selection, ventilation and temperature control.

4. A cooking device, comprising:
    a container to suspend one or more food items near a first end of a round container;
    a combustible heat source placed near a second end of the round container;
    a food hanger coupled to one or more support bars to vertically suspend one or more food items inside the container above the heat source to cook the one or more food items without rotating, flipping or turning to avoid unwanted searing on a hot grate surface and enabling dual use as a barbeque as determined by fuel selection, ventilation and temperature control;
    a lid comprising three tabs on a lower surface of the lid, wherein the three tabs rest on three respective inclined rails, wherein the tabs rest on corresponding inclined rails to create a variable gap between the container and the lid to provide air escape or exhaust ventilation and wherein working in combination, the lid, tabs and incline rails control an air escape or exhaust which controls allowable air entering though the intake ventilation holes between the heat source and the food item.

5. The device of claim 4, comprising a variable height grate between the heat source and the one or more food items.

6. The device of claim 4, wherein the container comprises a vertically standing round shaped drum.

7. The device of claim 4, wherein the one or more food items are cooked without directly contacting a grate to minimize carcinogens in the food item.

8. The device of claim 4, comprising a predetermined fuel and an air vent for controlling ventilation and temperature to provide a barbeque machine or a smoker.

9. The device of claim 4, comprising wherein the lid comprises a removable lid to enclose the container.

10. The device of claim 4, comprising one or more horizontal bars across a top end of the container and one or more S-shaped hooks to hang from the one or more horizontal bars.

11. The device of claim 4, comprising a plurality of casters positioned on a bottom of the container for moving the container.

12. A method for cooking one or more food items, comprising:
    vertically suspending each food items inside a container;
    placing a heat source under the vertically suspended food items, wherein the heat source is a combustible heating source;
    one or more sets of intake ventilation holes to enable natural convection action by the heat source up through the food item;
    providing a lid comprising three tabs on a lower surface of the lid, wherein the three tabs rest on three respective inclined rails wherein the tabs rest on corresponding inclined rails to create a variable gap between the container and the lid to provide air escape or exhaust ventilation and wherein working in combination, the lid, tabs and incline rails control an air escape or exhaust which controls allowable air entering though the intake ventilation holes between the heat source and the food item; and a handle fastened to a top of a lid that enables rotation of the lid with one or more tabs fastened to a lower surface of the lid; and
    cooking the one or more food items without rotating, flipping or turning to avoid searing on a hot grate surface.

13. The method of claim 12, comprising providing a variable height grate between the heat source and the one or more food items.

14. The method of claim 12, comprising forming the enclosed container from a vertically standing round shaped drum.

15. The method of claim 12, comprising cooking the one or more food items without directly contacting a grate to minimize carcinogens in the food item.

16. The method of claim 12, comprising selecting fuel and controlling ventilation and temperature to provide a grill, a barbeque machine or a smoker.

17. The method of claim 12, comprising providing one or more horizontal bars across a top end of the container and one or more S-shaped hooks to hang from the one or more horizontal bars.

18. The method of claim 12, comprising providing a removable lid to enclose the container.

19. The method of claim 12, comprising moving the container on a plurality of casters positioned on a bottom of the container.

* * * * *